A. E. SMITH.
DUST GUARD.
APPLICATION FILED NOV. 23, 1907.
925,141.
Patented June 15, 1909.
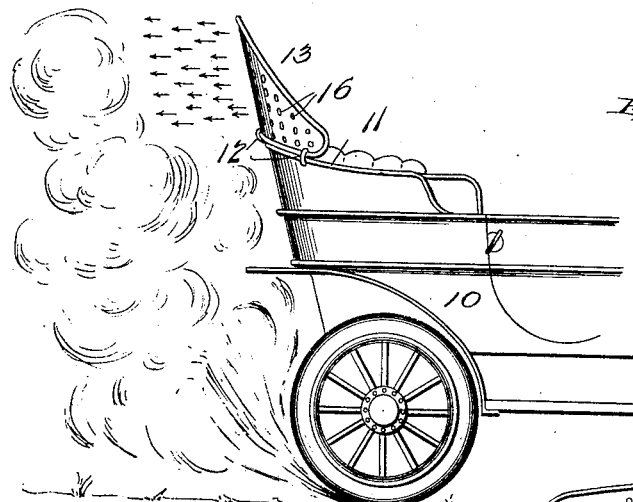
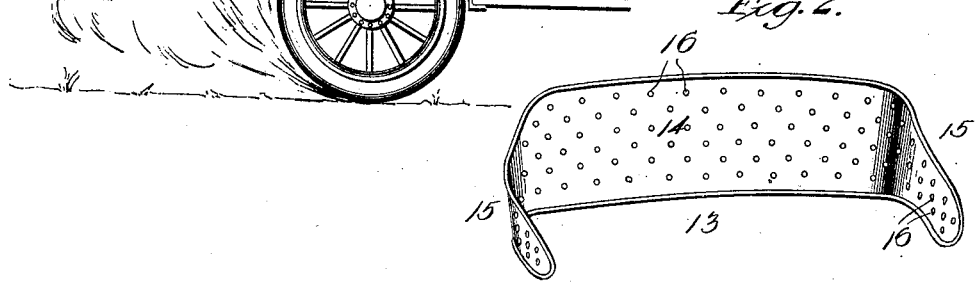
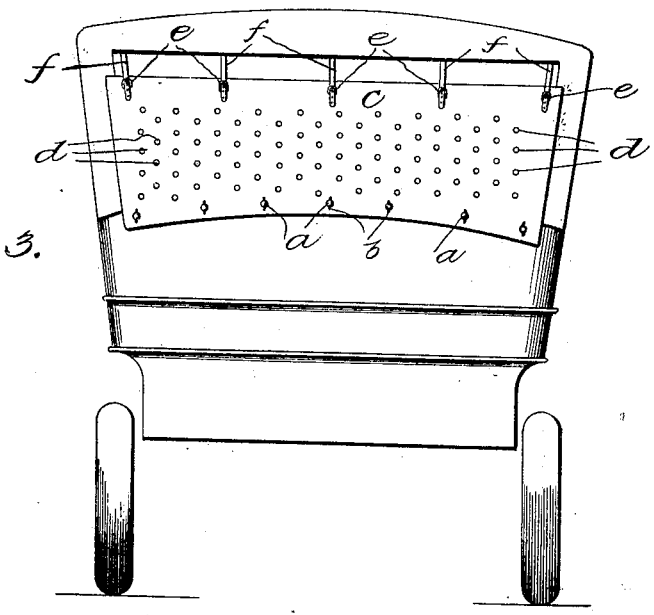

UNITED STATES PATENT OFFICE.

ALBERT E. SMITH, OF SOUTH BEND, INDIANA.

DUST-GUARD.

No. 925,141.  Specification of Letters Patent.  Patented June 15, 1909.

Application filed November 23, 1907. Serial No. 403,465.

*To all whom it may concern:*

Be it known that I, ALBERT E. SMITH, a citizen of the United States, residing at South Bend, in the county of St. Joseph and State of Indiana, have invented certain new and useful Improvements in Dust-Guards, of which the following is a specification.

This invention consists in certain improvements in attachments for motor vehicles, and has specially in view the provision of a dust guard for the vehicle which will prevent dust laden air from flowing over the rear end thereof when traveling at a rapid speed.

With the above and many other objects in view, the invention contemplates the provision of a dust guard which is carried at the back of the vehicle and provided with means by which the pressure of the wind at its forward side is utilized to produce a plurality of sharp blasts of air in a rearward direction to break the vacuum behind the vehicle incident to its rapid forward movement.

In carrying out the invention as stated in the above objects, the same is susceptible of various modifications, but preferred embodiments of the same are shown in the accompanying drawings, wherein—

Figure 1 is a side elevation of a portion of a motor vehicle, showing the improved dust guard attached thereto and also indicating its practical application. Fig. 2 is a perspective view of the same detached from the vehicle. Fig. 3 is a rear view of a motor vehicle showing the same provided with a modified form of the dust guard.

Like characters of reference refer to corresponding parts.

As is well known in connection with motor vehicles, when the same are being driven at a fast speed, a vacuum is formed immediately at the rear of the body thereof, and the rush of the dust-laden air into said vacuum causes a considerable amount of the dust to sift over the rear of the vehicle and onto the occupants of the seats. To overcome this objection the form of dust guard shown in the accompanying drawings has been produced. In the said drawings, and referring more particularly to Fig. 1 thereof, the body 10 of the motor vehicle has at its upper edge 11 a plurality of fasteners 12 adapted to engage with and retain a dust guard 13 in an upright position thereon. The said dust guard 13 comprises a body portion 14 formed of leather or other preferred material from which project forwardly the tapered, rounded side arms 15—15. The bottom edge of the dust guard is of the same curvature as the top edge of the back of the vehicle, and said edge and also the entire surrounding edge of the dust guard is preferably reinforced to provide a rigid structure. The portion of the dust guard inclosed by said reinforced edges is provided with perforations 16.

In using the dust guard as described above, the same is attached to the rear of the back of the vehicle by means of the fasteners 12 engaging the reinforced bottom edge in such a manner that at the back of the vehicle a wide shielding surface will be provided, the reduced or tapering side arms projecting forwardly therefrom, thereby serving as a dust guard for both the rear of the machine and a portion of both sides thereof. As the machine progresses forwardly the rush of air against the forward side of the dust guard results in a considerable wind pressure being exerted against said dust guard, and as the perforations only permit of a limited amount of the wind passing through the perforations, the result is that such wind is delivered to the rear of the machine in a plurality of sharp blasts of sufficient force to break the vacuum immediately in the rear thereof, and also to force backward the dust-laden air which is rushing toward said vacuum.

In Fig. 3 of the drawings a modified form of the invention has been provided, the same being of special utility in connection with motor vehicles provided with a top or shade. In said figure the upper rear portion of the back of the body is provided with a plurality of buttons *a* adapted to be engaged by a plurality of button holes *b* formed in the bottom of a curtain or dust guard *c*. Said curtain or dust guard *c* is of a type similar to the usual rear curtain of vehicles, and in the body portion thereof is formed a plurality of perforations *d*. Preferably, the curtain or dust guard does not entirely close the rear opening between the top of the vehicle and the top of the rear edge of the back, and at the top edge, said dust guard or curtain is provided with a plurality of buckles or the like *e* which engage with a plurality of straps *f*, carried by and depending from the top of the vehicle.

In either form of the invention as shown, it will be readily understood that the dust guard, owing to the form of fasteners used to retain it in connection with the vehicle, may be readily detached therefrom when it is not desired to use it—in Fig. 1 by releasing the fasteners 12 from engagement with the reinforced bottom edge of the dust guard, and in Fig. 3, by releasing the straps $f$ and the button holes $b$. And it will be further understood that the form of dust guard shown is one that has a double function. It destroys the vacuum at the rear of the vehicle thereby protecting the occupants from the dust-laden air, and at the same time reduces the air pressure at the front of the dust guard by means of the perforations.

I claim as my invention:—

1. The combination with a vehicle, of a dust guard comprising a curved body having one edge adapted to be secured to the back of a seat in said vehicle, said edge conforming to the contour of said seat, said body being provided with curved side arms, said body and arms being perforated.

2. The combination with a vehicle, of a dust guard comprising a curved body supported on one edge and adapted to be secured to the back of a seat in said vehicle, said body being provided with forwardly curved tapered side arms, said body and arms being perforated.

In testimony whereof I affix my signature, in presence of two witnesses.

ALBERT E. SMITH.

Witnesses:
S. E. BABCOCK,
J. DU SHANE.